United States Patent [19]
Streck et al.

[11] Patent Number: 5,241,410
[45] Date of Patent: Aug. 31, 1993

[54] ENHANCED INFRARED-CONNECTED TELEPHONE SYSTEM

[75] Inventors: Donald A. Streck, Ojai; Jerry R. Iggulden, Santa Clarita, both of Calif.

[73] Assignee: LitePhone Systems Ltd., Woodland Hills, Calif.

[21] Appl. No.: 541,518

[22] Filed: Jun. 21, 1990

[51] Int. Cl.⁵ .......................................... H04B 10/02
[52] U.S. Cl. .................................. 359/176; 359/152; 379/55; 379/56; 455/40
[58] Field of Search ...................... 455/40, 41, 66, 601, 455/603, 617, 612, 600; 359/145, 152, 154, 174, 176; 379/56, 55

[56] References Cited

U.S. PATENT DOCUMENTS

| | | | |
|---|---|---|---|
| 3,715,664 | 2/1973 | Ikrath | 455/40 |
| 4,709,412 | 11/1987 | Seymour | 455/603 |
| 4,727,600 | 2/1988 | Avakian | 455/601 |
| 4,809,257 | 2/1989 | Gantebein | 455/601 |
| 4,809,359 | 2/1989 | Dockery | 359/145 |
| 4,897,883 | 1/1990 | Harrington | 455/603 |
| 4,916,460 | 4/1990 | Powell | 359/145 |

FOREIGN PATENT DOCUMENTS

0346925 12/1989 European Pat. Off. ............ 359/145

*Primary Examiner*—Edward L. Coles, Sr.
*Assistant Examiner*—Kinfe-Michael Negash
*Attorney, Agent, or Firm*—Donald A. Streck

[57] ABSTRACT

This invention provides a number of improvements to wireless telephone systems. There is an adapter box for interfacing standard telephone equipment to an IR-based telephone interface to replace the acoustic modem now used. A telepoint repeater system allows users to "roam" throughout the area and not be tied to a particular IR input point in the building. An IR through-the-wall repeater conducts an IR signal through a wall without having to bore a hole through it. A public telephone call-back enhancement allows a caller on an IR public telephone system to receive incoming calls. A handset credit interface system allows a portable handset (IR, RF, or cellular) to be employed as a credit transaction interface transmitting credit information directly to the credit computer. An IR interfacing base station allows a handset intended for interfacing with a public telepoint to be used at home for connection to the home's telephone line as a wireless telephone. A multi-purpose handset system includes RF transmission capability with IR capability. A passive handset system includes light-modulating smartcard technology in the handset for modulating and returning the lightbeam from the telepoint so as to provide extremely low power consumption by the handset. There is an IR PBX type telephone system. The IR telepoint is also used as a building multi-user interface to connect a plurality of users from a building to a telepoint at a site of multiple telephone lines employing an IR link. An IR telephone system for convention centers, stadiums, etc. is disclosed.

3 Claims, 10 Drawing Sheets

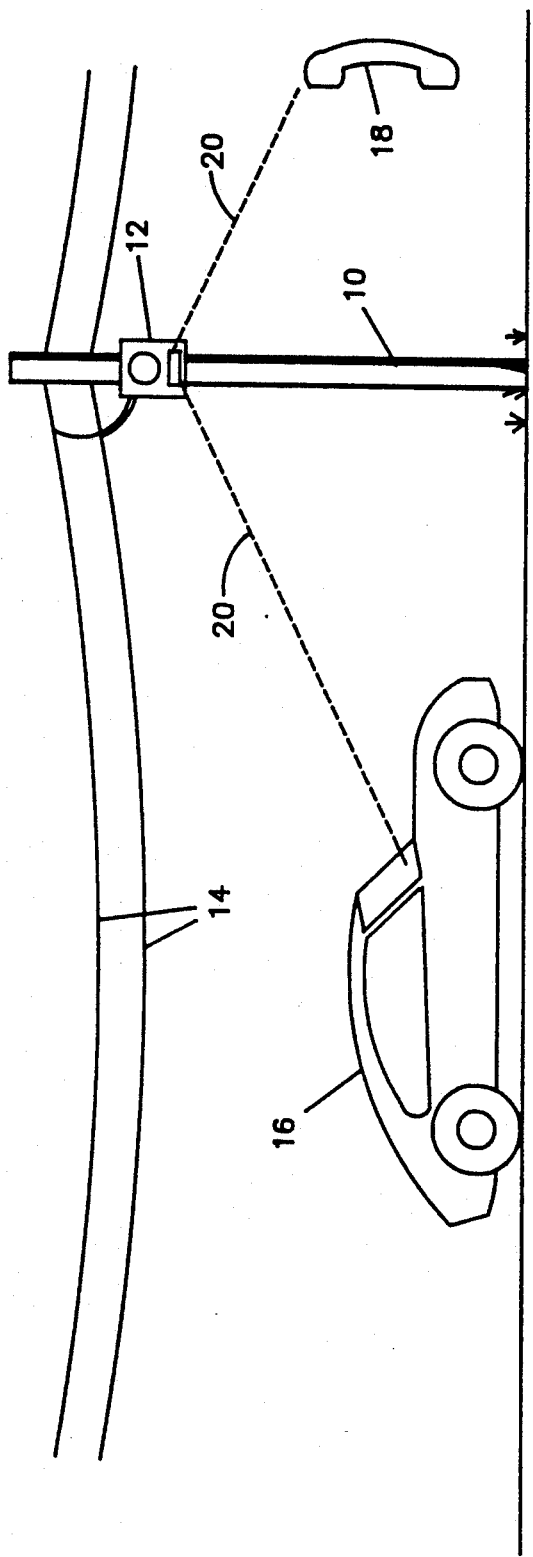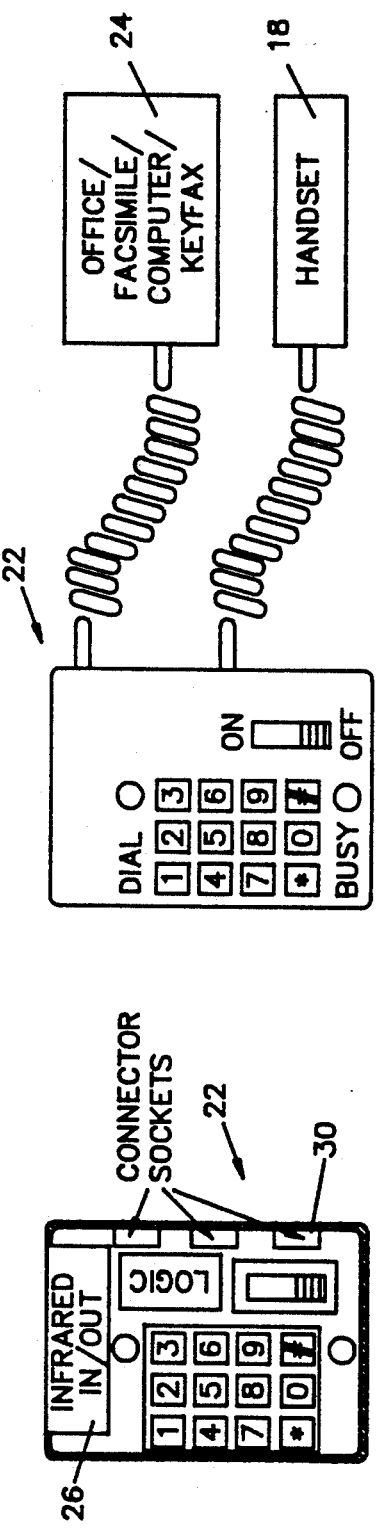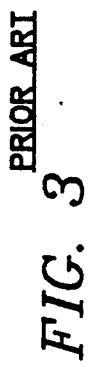
FIG. 1 PRIOR ART
FIG. 2 PRIOR ART
FIG. 3 PRIOR ART

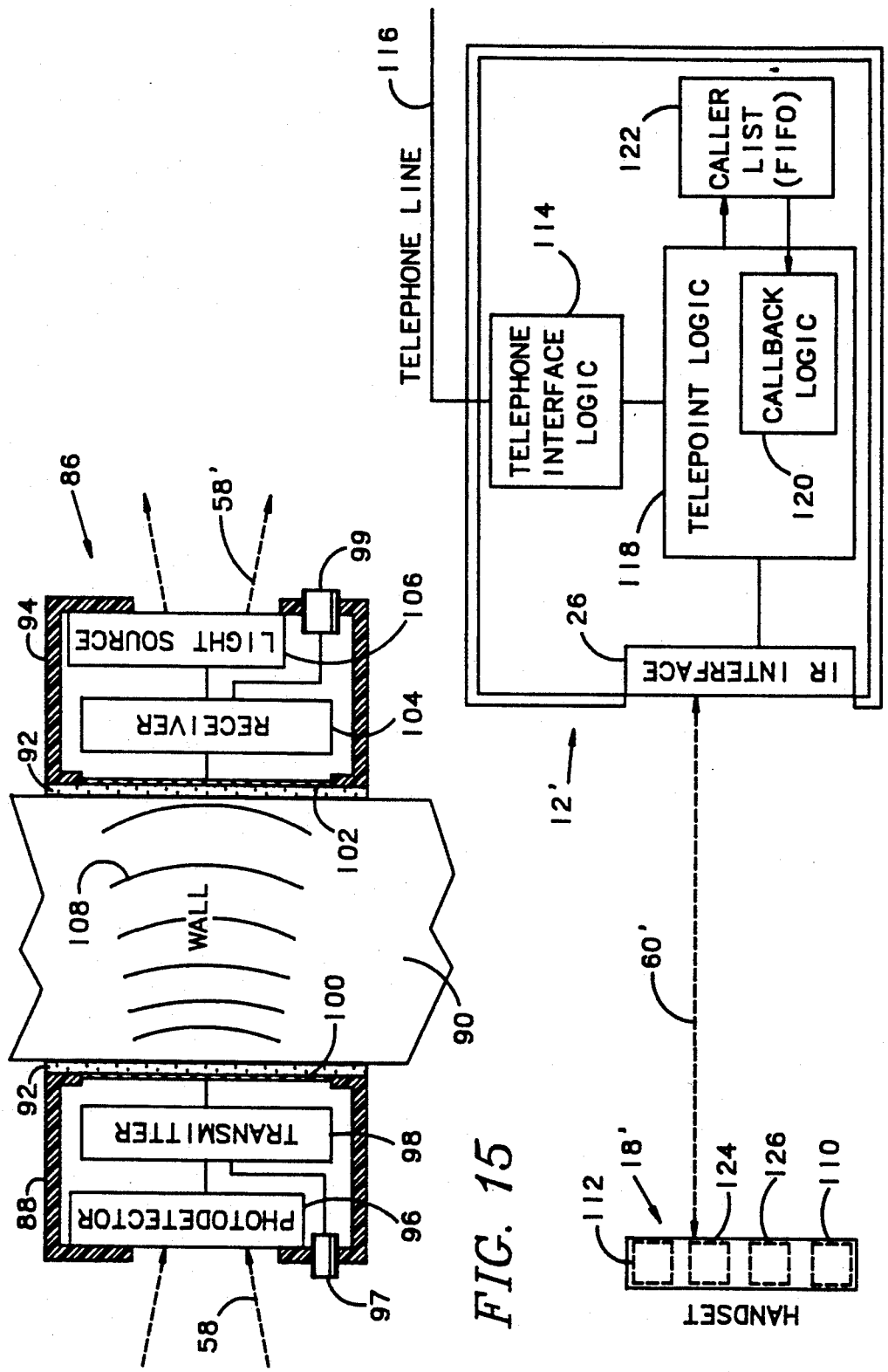

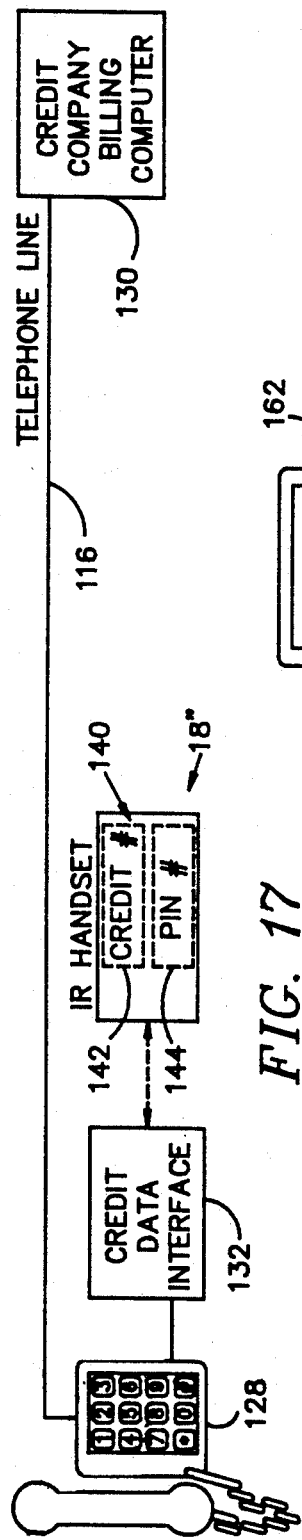
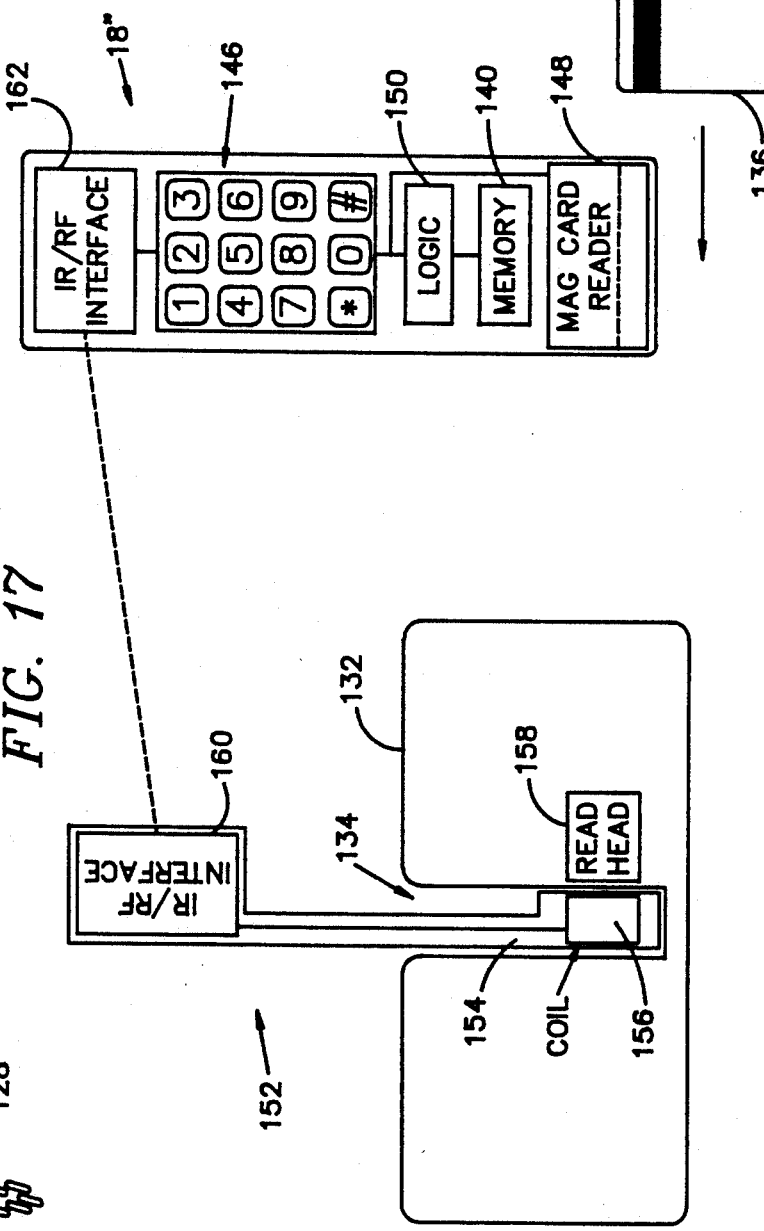
FIG. 17
FIG. 18

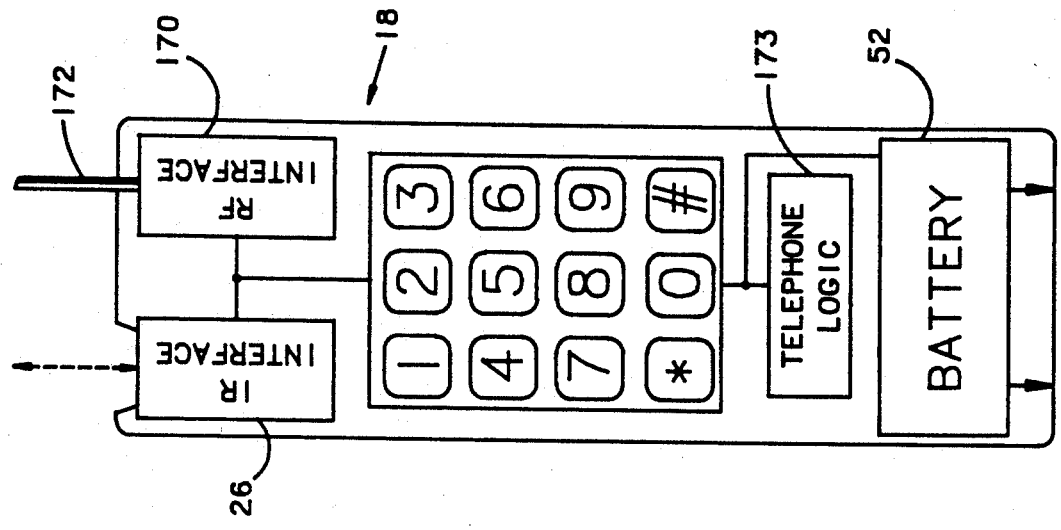
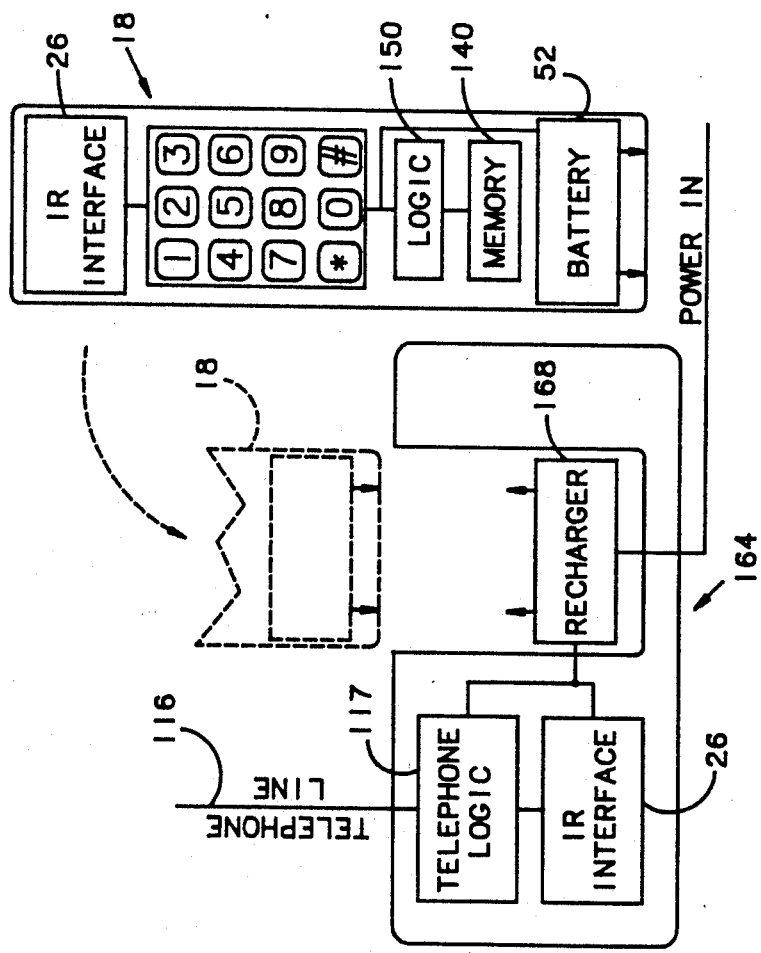
FIG. 19
FIG. 20

ENHANCED INFRARED-CONNECTED TELEPHONE SYSTEM

BACKGROUND OF THE INVENTION

In our now-issued U.S. Pat. No. 4,856,046 entitled REMOTE PUBLIC TELEPHONE LINK, we described the basic elements of a telephone system in which a user is connected to a telephone system for audio and/or data transmission purposes by means of an infrared (IR) lightbeam link. While that patent described the basic approach to such a system, there are numerous specific applications therefor which require modified approaches to the equipment. This application is directed to several problems that may be encountered and unique solutions therefor not disclosed or claimed by our prior patent.

For brevity of this application, the problems which are solved by the novel embodiments described in detail hereinafter will not be described in detail in this Background portion; but rather, will be addressed as part of each individual description.

DESCRIPTION OF THE DRAWINGS

FIG. 1 is a simplified drawing of the basic approach to an IR telephone system provided by our prior patent.

FIG. 2 is a simplified drawing of the inside of a universal user unit according to our prior patent.

FIG. 3 is a simplified drawing of the outside of a universal user unit according to our prior patent as in FIG. 2 showing how various devices can be connected thereto.

FIG. 15 is a functional block diagram of an IR signal repeater for transmitting an IR signal through a wall in an IR telephone system according to this invention.

FIG. 16 is a functional block diagram of a handset and telepoint according to the present invention for allowing users to receive incoming calls at a telepoint which has a telephone number associated therewith.

FIG. 17 is a simplified partial functional block diagram of an IR telephone interface according to the present invention for providing a credit interface at retail establishments and the like.

FIG. 18 is a more detailed partial functional block diagram of components of a credit interface as in FIG. 17 for use with existing credit card magnetic strip readers and depicting a handset which includes a magnetic strip reader for self-programming of credit data.

FIG. 19 is a partial functional block diagram of a base station for adapting a universal IR handset to home use and recharging.

FIG. 20 is a partial functional block diagram of a dual-mode handset according to this invention which can be used to access either an RF base station such as with so-called cellular telephone system and the like or to access an IR telepoint.

DESCRIPTION OF THE PREFERRED EMBODIMENT

Figure 6:
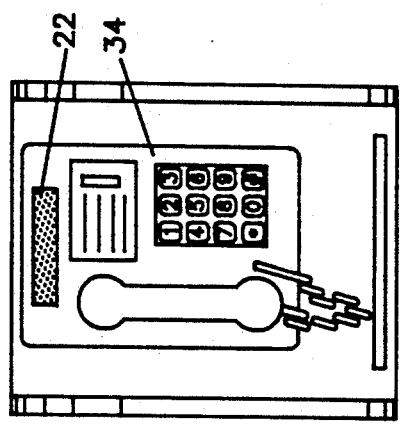
FIG. 6 is a simplified drawing of a public telephone containing an IR telepoint according to the teachings of our prior patent.

In our above-referenced prior patent, we described an IR telephone system substantially as shown in FIG. 1. The telephone pole 10 has a telepoint 12 mounted thereon and connected to the telephone wires 14. A user within the car 16 or at an outside location as symbolized by the handset 18 establishes a connection to the telepoint by an IR beam 20. A connection is thus made between the user and the telephone wires 14 allowing the user to make a credit-billed telephone call in the usual manner. As depicted in FIGS. 2 and 3, one proposed embodiment of our prior patent was to employ a universal interface box 22 a the user's end into which standard equipment such as a handset 18 or portable office/facsimile/computer/or KeyFAX ™ device (as symbolized by the box 24) can be connected using a standard RJ-11 plug arrangement as is typically contained on the connecting cord of such devices.

Figure 4:
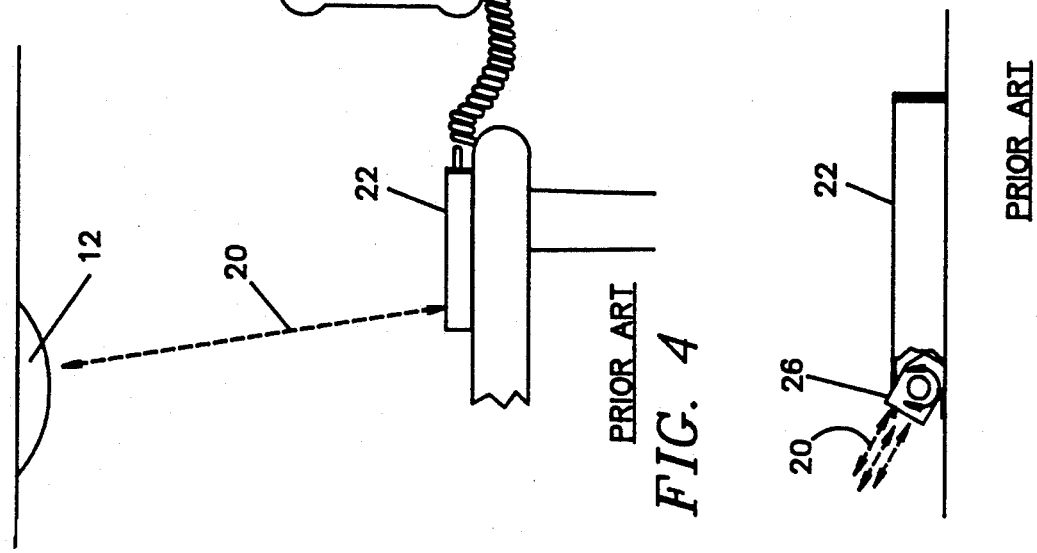
FIG. 4 is a simplified drawing of the universal user unit of FIG. 2 showing how an IR link can be established with a telepoint located on the ceiling.
Figure 5:
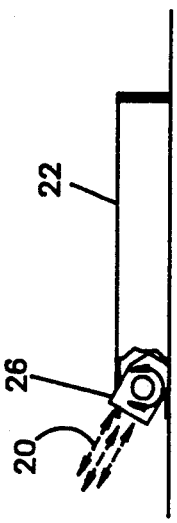
FIG. 5 is a simplified, partially cutaway drawing of the universal user unit of FIG. 2 showing a suggested rotational IR transmitting and receiving unit that can be employed therein to facilitate making an IR link with a telepoint located on the ceiling.

As depicted in FIG. 4, we suggested that in restaurants, waiting rooms, etc. the telepoint 12 could be mounted on the ceiling. FIG. 5 shows a rotatable IR interface portion 26 that could be employed to make connection to the telepoint 12 easier. FIG. 6 depicts our suggestion in the prior patent of how the telepoint 12 could be incorporated into a standard, prior art public telephone for dual mode use.

Figure 8:
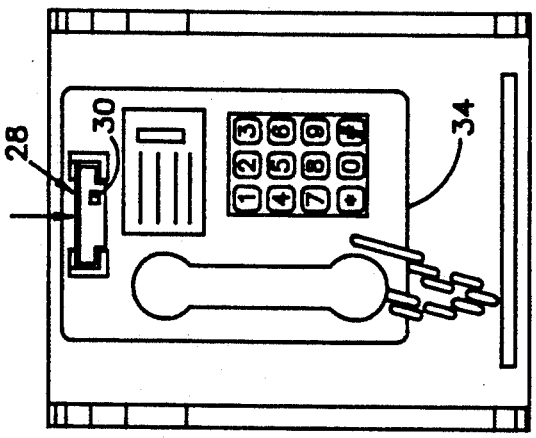
FIG. 8 is a simplified drawing of a public telephone containing an IR telepoint according to the reachings of the present invention as shown in FIG. 7 with the data connecting port attached thereto.
Figure 7:
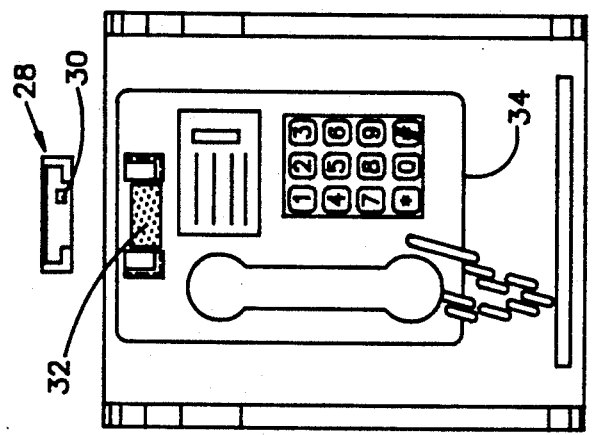
FIG. 7 is a simplified drawing of a public telephone containing an IR telepoint according to the teachings of the present invention with a data connecting port ready for attachment thereto.
Figure 10:
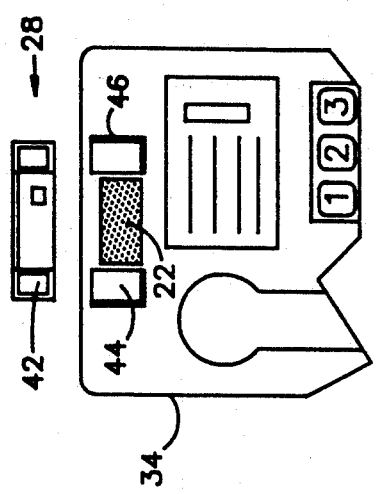
FIG. 10 is an enlarged simplified drawing of the data connecting port of this invention in an embodiment which hooks onto the telephone for attachment thereto.
Figure 11:
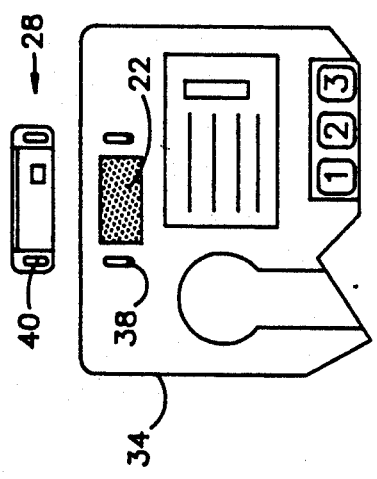
FIG. 11 is an enlarged simplified drawing of the data connecting port of this invention in an embodiment which magnetically attaches to a telephone.
Figure 9:
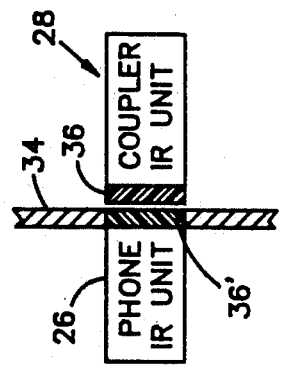
FIG. 9 is a functional block diagram of the elements of the data connecting port and its IR interface.
Figure 12:
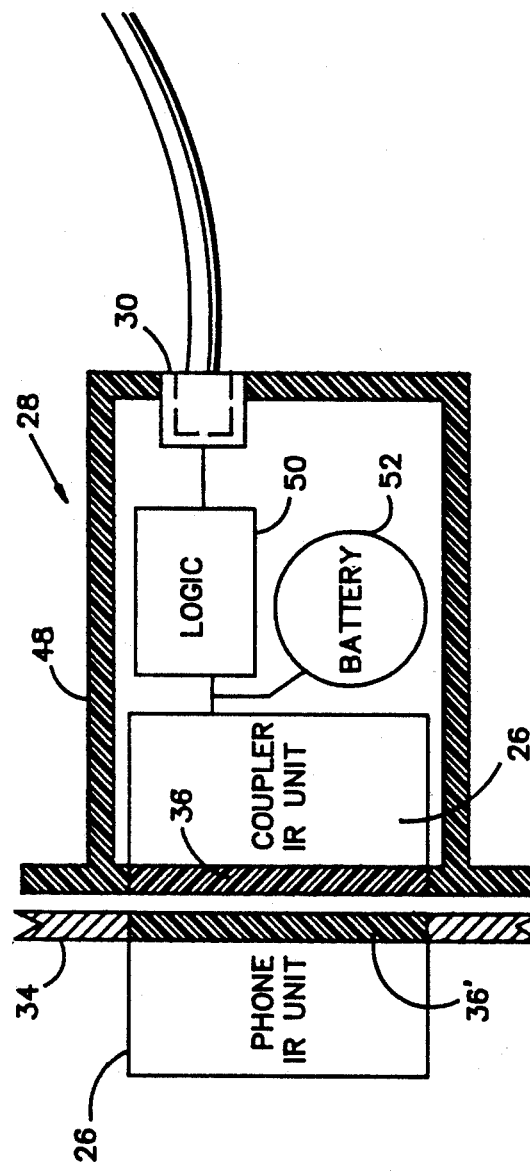
FIG. 12 is a more detailed functional block diagram of the data connecting port of this invention.

A first problem to be addressed herein is that of providing a data port on a public telephone. While our prior art embodiment of FIGS. 2-5 can be employed from an automobile, or the like, to connect a portable facsimile machine or KeyFAX TM device to a public telephone line via a public telephone such as that of FIG. 6, there are many instances where a user wishes to, or must, make connection at the telephone. At present, the only way that one can connect a data device such as a facsimile machine or computer modem to a public telephone is if one has an acoustic modem which will accept the handset of the telephone. According to the present invention and as depicted in FIGS. 7 and 8 a data connecting port 28 having an RJ-11 jack 30 into which such devices can be plugged is positioned over the IR interface window 32 of the phone 34. This approach is shown in simplified form in FIG. 9. The data connection port 28 has a window 36 at the front thereof through which IR light can pass. Similarly, the IR interface portion 26 of the telephone 34 has a window 36' for the passage of IR light therethrough. There is, therefore, no opening or the like on the front of the telephone 34 subject to vandalism by way of insertion of foreign objects therein. If chewing gum or such is placed over the window 36', it can be removed sufficiently for the passage of IR through an least a sufficient portion thereof to create an IR link between the port 28 and the interfacing portion 26. As depicted in FIGS. 10 and 11, the data connecting port 28 can be removeably attached to the telephone 34 by hooks 38 on the telephone 34 engaging slots 40 in the data connecting port 28 or by magnets 42 on the data connecting port 28 gripping ferro magnetic portions 44 on the telephone 34 within guides 46. The preferred construction for a stand-alone data connecting port 28 is shown in FIG. 12. The data connecting port 28 comprises a case 48 having the window 36 on a front surface thereof. The IR interfacing portion 26 is behind the window 36 and has the required logic 50 connected thereto. Power is supplied by a small, long-life battery 52, such as a lithium battery. The RJ-11 jack 30 is mounted in the case 48 and connected to the logic 50.

Figure 13:
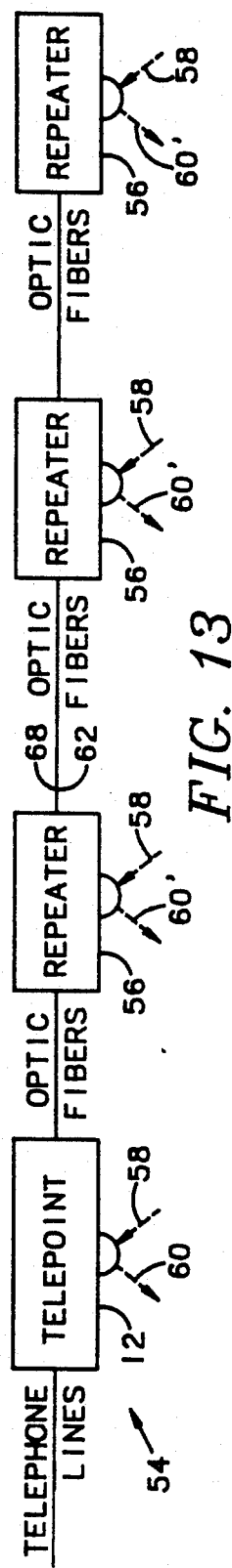
FIG. 13 is a simplified functional block diagram of a telepoint repeater system according to this invention for allowing users to roam through a building while maintaining an IR link to the telephone system.
Figure 14:
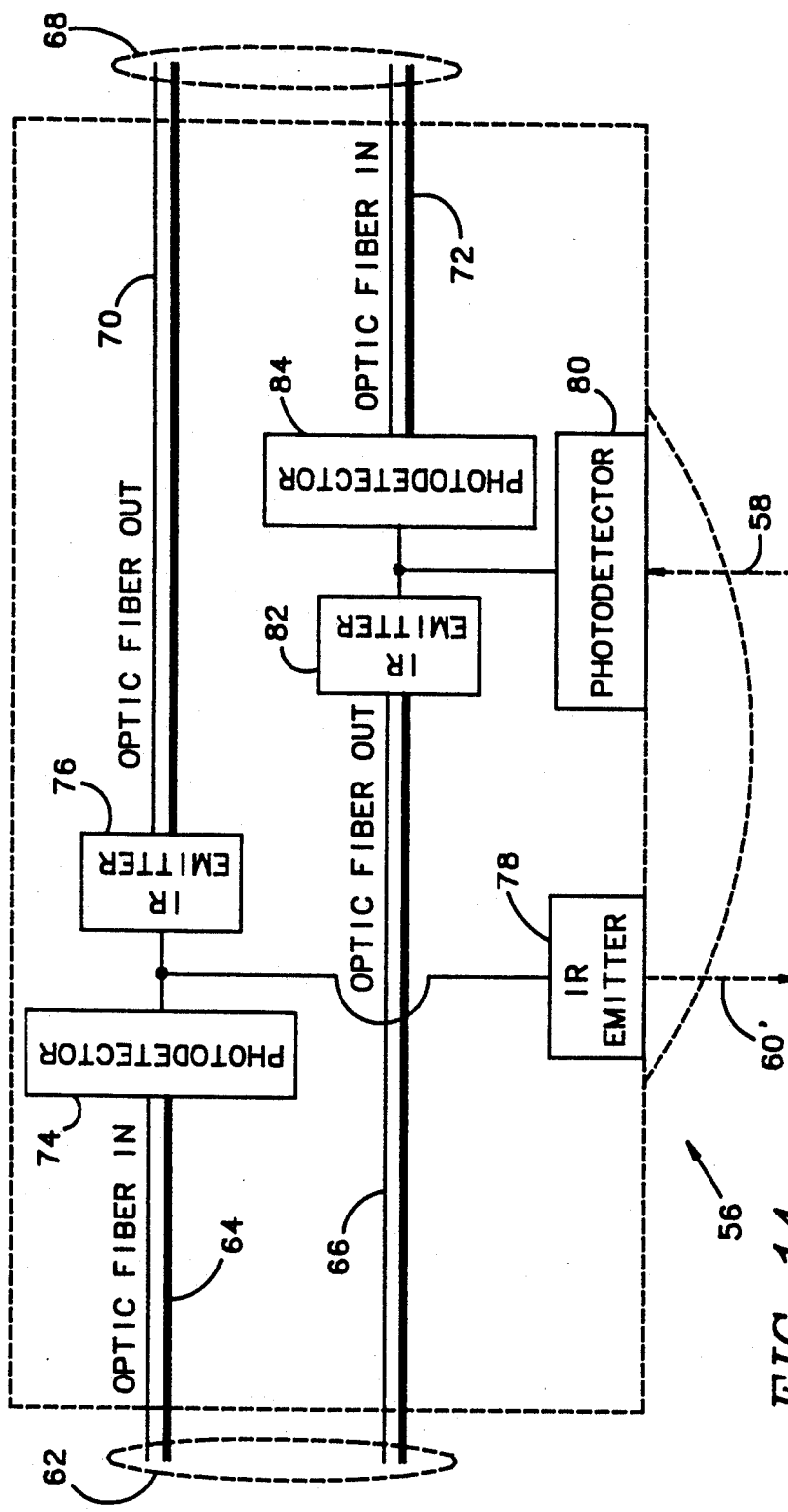
FIG. 14 is a detailed functional block diagram of one repeater in the telepoint repeater system of FIG. 13.

Another problem to be solved is that of "roaming". In a public telephone installation, the IR telephone system of our prior patent is not faced with this problem. The user simply positions him/herself in a line-of-sight position with respect to the telepoint 12 and places a call. Limited movement is possible as long as the telepoint remains in sight. If the system is installed within a building, as for example a company facility, a user making a call may wish to move out of a line-of-sight relationship with the base station (i.e. telepoint) from which the call was made (or answered according to other aspects of this invention which will be discussed shortly). In other words, the user may wish to roam to another location, office, etc. as would be possible with an RF-based "wireless" telephone system. The repeater system 54 of FIGS. 13 and 14 provides this capability to our prior art IR telephone system. As depicted therein, in a preferred embodiment one or more bi-directional optical repeaters 56 are connected to the telepoint 12. An IR input 58 at the telepoint 12 or any repeater 56 produces an input signal at the telepoint 12. Likewise, any IR output 60 from the telepoint 12 is also simultaneously output at each repeater 56. As shown in greater detail in FIG. 14 the preferred repeater 56 has an input optic cable 62 containing an input fiber 64 and an output fiber 66. It also has an output optic cable 68 containing an output fiber 70 and an input fiber 72. An IR output 60 from the telepoint 12 (or from a preceding repeater 56) is also input to the input fiber 64. The input fiber 64 is connected to direct the light onto a photodetector 74. The electrical output from the photodetector 74 is, in turn, connected to a pair of IR emitters 76 and 78. The IR emitter 76 is connected to provide an input to the output fiber 70 which passes the light signal to the next repeater 56. The IR emitter 76 provides the duplicate IR output 60' at the repeater 56. A similar arrangement sends input signals at the repeater 56 back to the telepoint. A photodetector 80 senses in the IR input 58 and sends an electrical signal to an IR emitter 82 connected to the output fiber 66. The output fiber 66 of a repeater 56 is connected to the input fiber 72 of the next preceding repeater 56. The input fiber 72 is connected to direct light onto a photodetector 84 which has its electrical output connected to the IR emitter 82. Thus, the bi-directional loop is closed. The telepoint 12, of course, includes interfacing components as described above.

Another impediment to "roaming" (and similar undertakings) with an IR-based system of any kind is that of walls, partitions, etc. The IR beam must be line-of-sight and such solid objects block that line of sight. The IR signal repeater system 86 of FIG. 15 solves that problem. The system 86 comprises a receiving unit 88 attached to one side of the wall 90 as with adhesive 92. A retransmitting unit 94 is attached to the wall 90 opposite the receiving unit 88. The receiving unit 88 comprises a photodetector 96 connected to a first transceiver 98 which, in turn, is connected to an antenna 100. The retransmitting unit 94 comprises an antenna 102 connected to a second transceiver 104 which, in turn, is connected to a light source 106 which in the preferred embodiment is an LED. The IR signal repeater system 86 can operate in either of two preferred ways if no physical penetration of the wall 90 is desired. Otherwise, the simplest way of operation is to replace the two antennas 100, 102 with a physical wire through the wall 90. For non-physically connected operation according to a first approach, the signal through the wall passes by inductance. The first transceiver 98 is of a type well known in the art which will cause the antenna 100 to emit a magnetic energy signal 108 into the wall 90. The signal 108 induces an electrical signal into the antenna 102 which is amplified as necessary and applied to the light source 106 by the second transceiver 104. In a second approach, the signal through the wall passes by radio frequency. The first transceiver 98 is of a type well known in the art which will cause the antenna 100 to emit an RF energy signal 108 into the wall 90. The signal 108 is detected by the antenna 102 and then amplified as necessary and applied to the light source 106 by the second transceiver 104.

As those skilled in the art will readily recognize and appreciate, the IR signal repeater system 86 of FIG. 15 can be made bi-directional by having the above-described components configured to work in both directions. Such a capability might be of particular interest in many installations. As those skilled in the art will further appreciate, the IR signal repeater system 86 of FIG. 15 can be employed in a number of different applications in addition to that of IR telephone signal transmission through walls, and the like. For example, IR signals are capable of transmitting a variety of subject matters including data, television, audio, and the like. Thus, the IR signal repeater system 86 of FIG. 15 could be employed in either a home or office environment to transmit any one, or all, of such signals through the area. This, of course, would greatly simplify the bringing of services into a building and the subsequent routing of the services through the building. Once a particular service signal had been connected into the building, its further routing could be easily made by employing multiple ones of the IR signal repeater system 86 of FIG. 15 as necessary. For ease of installation, one might wish to include and on-demand button 97 on the receiving unit 88 so as to cause the first transceiver to generate a signal and to include a signal strength reading device 99 as part of the retransmitting unit 94. In that way, the receiving unit 88 can first be mounted at a proposed position on the wall 90 and then the retransmitting unit 94 moved about on the opposite side of the wall 90 until the signal strength at the retransmitting unit 94 is maximized.

As mentioned earlier, the IR telephone system of our prior patent was designed to initiate telephone calls, but not to receive incoming calls. There are many instances where a caller at a public telephone site wishes to receive a call back at that phone. The inability of our prior apparatus to provide that capability, therefore, is a serious drawback for such installations. The additional provisions shown in FIG. 16 when added to the basic IR telephone system of our prior patent provide the desired call-back capability. Each handset 18' includes a unique coded identifier 110 and some notification device 112 (several suitable solid-state devices producing sounds being well known and commercially available). The telepoint 12' includes its usual telephone interface logic 114 connected between the incoming telephone line 116 and the telepoint logic 118. An IR interface portion 26 is also connected to the telepoint logic 118. Callback logic 120 is added to the telepoint logic 118 along with a memory 122 which is operated as a FIFO caller list. Some means 124 is added to the handset 18' for allowing a caller to place the handset's identifier 110 on the list in the memory 122. This can comprise a separate button or a unique combination of inputs on existing buttons such as those used for dialing desired telephone numbers. Such techniques are, of course, well known in the art and form no part of this invention per se. The logic 126 of the handset 18' must also be modified to operate in the manner now to be described. When a caller places an outgoing telephone call through the telepoint 12', the logic 126 in the handset 18' transmits the handset's identifier 110, which is placed on the list in the memory 122 by the callback logic 120 in the telepoint 12'. A user simply expecting an incoming call at the telepoint 12' activates the means 124 which causes the logic 126 to only send the identifier 110 to the telepoint 12' for addition to the list in the memory 122. The list can be only one item long if desired; however, it is preferred that it contain provision for several entries so that an intervening outgoing call will not prevent a waiting party from receiving an expected incoming call. Since the list is a FIFO device, the last "n" are maintained on the list with the oldest entries being eliminated as a new entry is added.

When the telepoint 12' receives an incoming call on the telephone line 116, the interface logic 114 responds to the call and transfers control to the callback logic 120. The callback logic 120 then outputs an IR output 60' for each entry on the list containing as part of the data stream the identifier 110 of that entry. Upon receiving an IR output 60' containing its identifier 110, the logic 126 of a handset 18' retransmits its identifier 110 back to the telepoint 12', whereupon the callback logic 120 then connects the handset 18' to the incoming call.

As those skilled in the art are no doubt aware, improved methods and apparatus for the inputting of credit information at retail points of sale, and the like, are always in demand. Whether the transaction is a true credit transaction or one of the emerging "cashless" transactions where a card replaces a check for providing assured cash transfer to the seller, the story is the same, the mode and method of the transaction should be easy and provide maximum assurances against misuse. The basic elements of our prior IR telephone system can be adapted easily to provide a greatly improved approach for accomplishing such credit transactions. A preferred method and associated apparatus is shown in FIGS. 17 and 18. At most retail outlets today, one finds a telephone 128 connected by a standard telephone line 116 to the billing computer 130 of a credit company (i.e., bank, etc.). There is also a credit data interface device 132 connected in parallel to the telephone 128. The typical device 132 contains buttons (not shown) for manually inputting transaction data along with a slot 134 (see FIG. 18) through which a consumer's credit card 136 can be passed to read the data from a magnetic strip 138 thereon. Such an approach is subject to misuse and abuse. If the credit card is stolen, it will be accepted by the retailer's equipment until such time as it is reported stolen and its use blocked at the computer 130. If the credit transaction is not accompanied by the purchaser signing a credit debit note of some kind (as in the large number of credit transactions now taking place from home telephones where all the credit information is provided verbally over the telephone to the retailer), the purchaser may later disavow the transaction. For those reasons, retail organizations desiring to obtain rights for major credit card sales may find it impossible or very expensive to provide such services. The system of FIGS. 17 and 18 eliminates these problems and, therefore, should make it easier and less costly to provide such services. To accomplish these ends, the IR handset 18" includes memory 140 for holding credit account numbers 142 and at least one personal identification (PIN) number 144. These can be input via the numerical input pad 146 of the handset 18" or, preferably, through a small magnetic card reader 148 incorporated into the handset 18". Thus, in the privacy of the home or office, the user inputs credit account data and associated PIN access data into the handset 18". Any standard IR telepoint 12 then becomes a credit input point. Unlike the situation where the buyer must present his or her credit card to the retailer thereby disclosing the account number, name, and expiration data for possible dishonest use at a later time, the credit data is transmitted only between the handset 18" and the computer 130. Authorized used is guaranteed because only one knowing the appropriate PIN number 144 can cause the logic 150 of the handset 18" to transmit the credit data. Thus, by agreeing with the credit institution beforehand that use of the handset 18" and associated PIN number 144 constitutes a "quasi-signature", the above-described problem of later disavowed credit purchases is eliminated.

For existing credit installations having the typical credit card reading input device 132, the adapter 152 of FIG. 18 can be employed. The adapter 152 has a bottom end 154 of printed circuit board material having a coil 156 formed thereon. In use, the bottom end 154 is inserted into the slot 134 so that the coil 156 is positioned opposite the read head 158 of the input device 132. The adapter 152 also includes an interface portion 160 which communicates with the handset 18" and is also connected to drive the coil 156. Data from the handset 18" is, therefore, transmitted to the interface portion 160 which drives the coil 156. The coil 156, in turn, induces a signal into the read head 158 which is then transmitted from the device 132 in the usual manner. Note that in FIG. 18 the interface portion 160 and its corresponding component 162 in the handset 18" are shown to be optionally IR or RF. That is because this particular portion of the present invention could be employed with either an IR- or RF-based wireless telephone system. Thus, the capability could be built into cellular and wireless handsets, if desired, to achieve the same benefits as described above for an IR phone system.

As can be seen from the description above, it is also desirable in most equipment to provide multiple uses so that the user is not burdened with the problem of purchasing or carrying redundant equipment just to obtain additional features. Wireless telephones are no exception. A typical telephone user may have a RF wireless telephone in the office. That telephone has a base station connected to the telephone line which includes a battery charger for charging the battery in the handset. The user's car contains a cellular telephone system connected into the telephone lines through a central office connected to the car by an RF link through the various "cells". This system, of course, includes another handset. If the user wants to access a personal cellular system such as the so-called CT-2, yet another handset with a battery requiring recharging is required. The ability to access an IR telephone system as in our prior patent calls for yet another rechargeable handset.

FIGS. 19 and 20 depict two possible solutions to the foregoing problems. As those skilled in the art will readily recognize and appreciate, by combining the modifications of FIGS. 19 and 20 with proper configurations of the IR system of our prior patent, one could actually provide all the above-mentioned telephone services (including the credit interface) with one small and lightweight handset. As depicted in FIG. 19, the user's RF-based wireless telephone (which is subject to RF interference and noise from fluorescent lights, etc.) can be replaced with the adapting base station 164. The basic handset 18 with which telepoints 12 are accessed away from home or office is used to connect to the telephone line 116 via the base station 164. This is accomplished by including public telephone interfacing logic from the telepoint 12 (as described in our prior patent) into the telephone logic 117 of the base station 164. The handset 18 is "fooled" into thinking that it is interfacing with a public telephone. The adapting logic is, of course, transparent to the user. The base station 164 also includes the only battery recharger 168 needed for the handset 18. In the user's automobile, the cellular system is modified only slightly to become part of this multi-mode approach. The cellular-unique functions normally contained in the handset are moved to the cellular transmitter. The cellular transmitter thus becomes a telepoint and connection to the same handset is accomplished by an IR link. Finally, if desired, the handset 18 can be modified as depicted in FIG. 20 to afford dual-mode interfaceability with existing telephone systems. This is accomplished by adding an appropriate RF interfacing portion 170 and antenna 172 for the RF-based system to be interfaced to. The mode of operation can be made selectable by the user. Preferably, however, the telephone logic 173 senses which type (or types) of signals are being employed and automatically selects the proper output combination. This could, of course, be IR/IR, IR/RF, or RF/RF.

Figure 21:
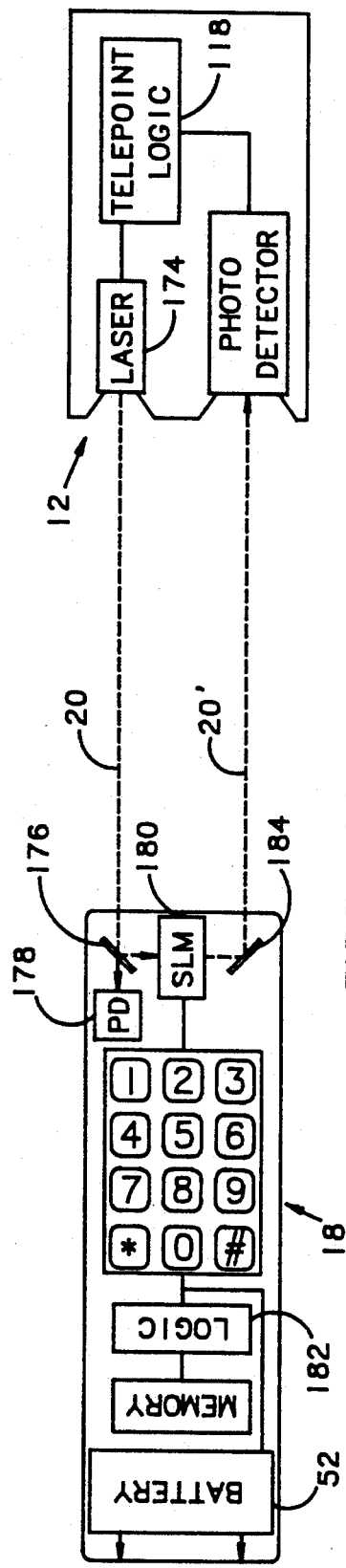
FIG. 21 is a partial functional block diagram of an IR telephone system wherein the handset is a passive device and the only lightbeam originates at the telepoint.

The IR telephone system of our prior patent employs an IR source and IR detector in both the handset 18 and the telepoint 12. This, of course, imposes higher power requirements on the handset 18 than if the handset 18 were not required to produce an IR beam of its own for transmitting data and audio to the telepoint 12. If this requirement were eliminated, the battery in the handset 18 (and correspondingly the handset 18 itself) could be made much smaller. FIG. 21 depicts a way of accomplishing this objective where the particular application is such as to work under the constraints imposed thereby. As will be appreciated from the description which follows, the handset 18 in this embodiment is a passive device; that is, all the light employed for data and audio transmission has its source in the telepoint 12. In the telepoint 12, the source of the IR beam 20 is a solid-state laser 174. Thus, the IR beam 20 is higher power but narrower in width. This means that alignment between the handset 18 and the telepoint 12 is more critical in this embodiment. In certain applications which will be obvious to those skilled in the art, this will not be a disadvantage. For example, this approach could be used quite effectively for the data connecting port 28 of FIGS. 7–12. The laser IR beam 20 enters the handset 18 where a portion passes through the partially-silvered mirror 176 to strike the photodetector 178 and produce an incoming signal for the handset 18. The majority of the IR beam 20 is reflected from the mirror 176 through a spatial light modulator 180 where it is modulated by the logic 182 to form the outgoing signal to the telepoint 12. The modulated IR beam 20' is then reflected by the mirror 184 back to the telepoint 12. The operation of the spatial light modulator 180 can best be understood by reference to U.S. Pat. No. 4,916,296 of Donald A. Streck entitled LIGHT MODULATING SMART CARD. What is implemented in the above-described invention is, in effect, a light-modulating smart card as described in that patent. As those skilled in the art will readily recognize and appreciate, the battery 52 is only required to power extremely low-power solid-state devices. Thus, long operation can be obtained with standard alkaline type non-rechargeable batteries.

Figure 22:
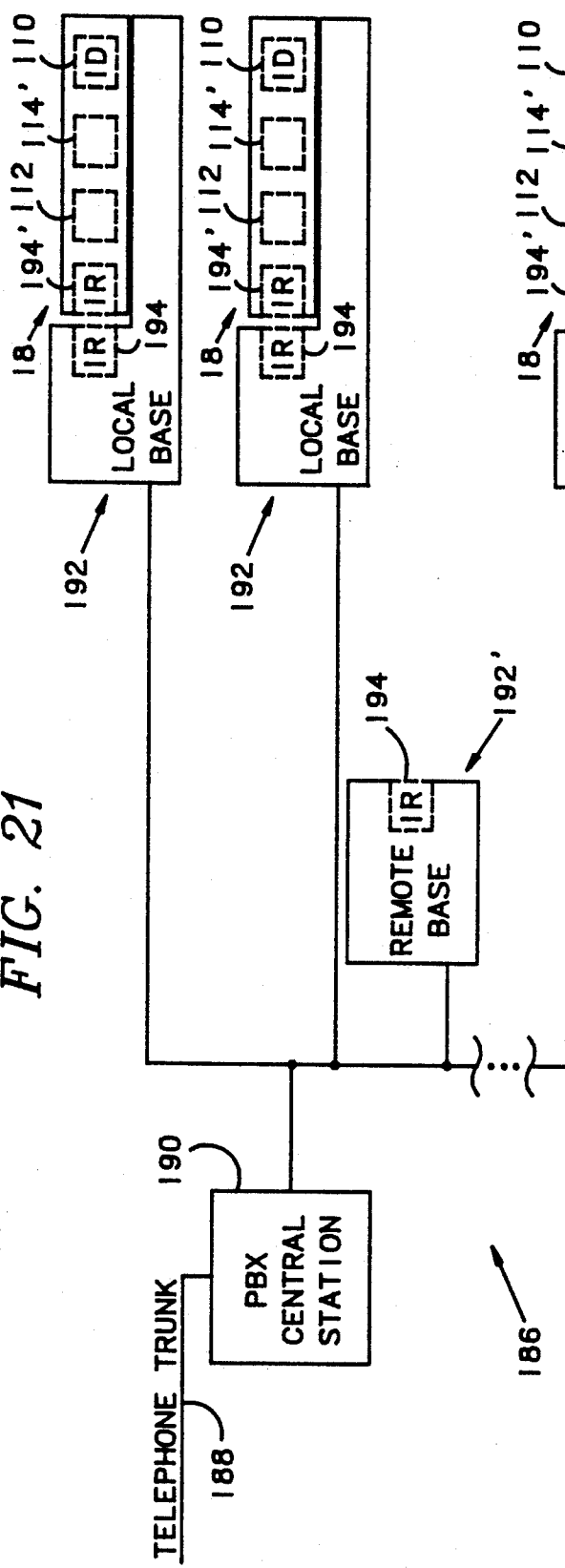
FIG. 22 is a simplified functional block diagram of an IR-based PBX type telephone system according to the present invention.

The next problem addressed by the present invention is telephone systems employed in multi-employee environments such as those referred to as PBX systems. In the typical prior art PBX telephone system, a number of extension telephones are connected to the PBX central station. Incoming calls are picked up by an operator (human or computer) at the central station and then directed to the designated recipient by his or her extension number. The extension rings and is picked up by the user, if present. Calls can be made from extension to extension. Also, the user can request an outside line and then dial a normal telephone number. In some more recent and computer-controlled systems, a user can "call forward" calls to another extension when out of the office. This whole process is greatly simplified by the IR PBX system 186 of this invention as depicted in FIG. 22. A telephone trunk 188 containing a plurality of telephone lines is connected to the PBX central station 190. The PBX central station 190, in turn, is connected to a plurality of PBX base stations 192. The connection to the base stations 192 is preferably made in the manner of the repeater system 54 of FIG. 13 such that each base station 192 acts in the manner of the optical repeaters 56 of FIG. 13. In fact, optical repeaters 56 can be included in the system and thereby act as a remote base 192' as included in FIG. 22. The base stations 192 include a bi-directional IR interface 194 which communicates with a similar IR interface 194' in the handset. Each handset 18 of the system 186 of FIG. 22 is substantially identical to the handsets of FIG. 16 in that they contain a coded identifier 110, a notification device 112, and interface logic 114'. The coded identifier 110 is the "extension number" of the handset 18. It will immediately be noted by those skilled in the art that the handset 18 contains the extension association as opposed to the base station 192 as is the case in prior art PBX type systems. Thus, when a call (internal or external) is received by the central station 190 for an extension, an IR signal is generated from all the IR interfaces 194 including the extension number (i.e. coded identifier 110) of the desired handset 18. The handset 18 having that coded identifier 110 rings whenever it is (as long as it is receiving IR from any IR interface 194) and the call is answered in like manner. Thus, such archaic features as "call forwarding" are made obsolete by the system 186 of FIG. 22. Note also that a user's pre-stored telephone numbers, and the like, in the handset 18 go with the user for use anywhere unlike prior art systems where the pre-sets are contained in a desk unit physically connected to the wall jack of the telephone system. For travelers such as business men and women, therefore, the handset 18 becomes a mobile Rolodex and replaces current electronic versions of that device altogether. To facilitate its usefulness in such applications, the handset 18 contains within its interface logic 114' the logic necessary to interface with a public telepoint of the type described in our above-referenced prior patent. This is yet another example of the multi-use handset concept that runs throughout this application.

Figure 23:
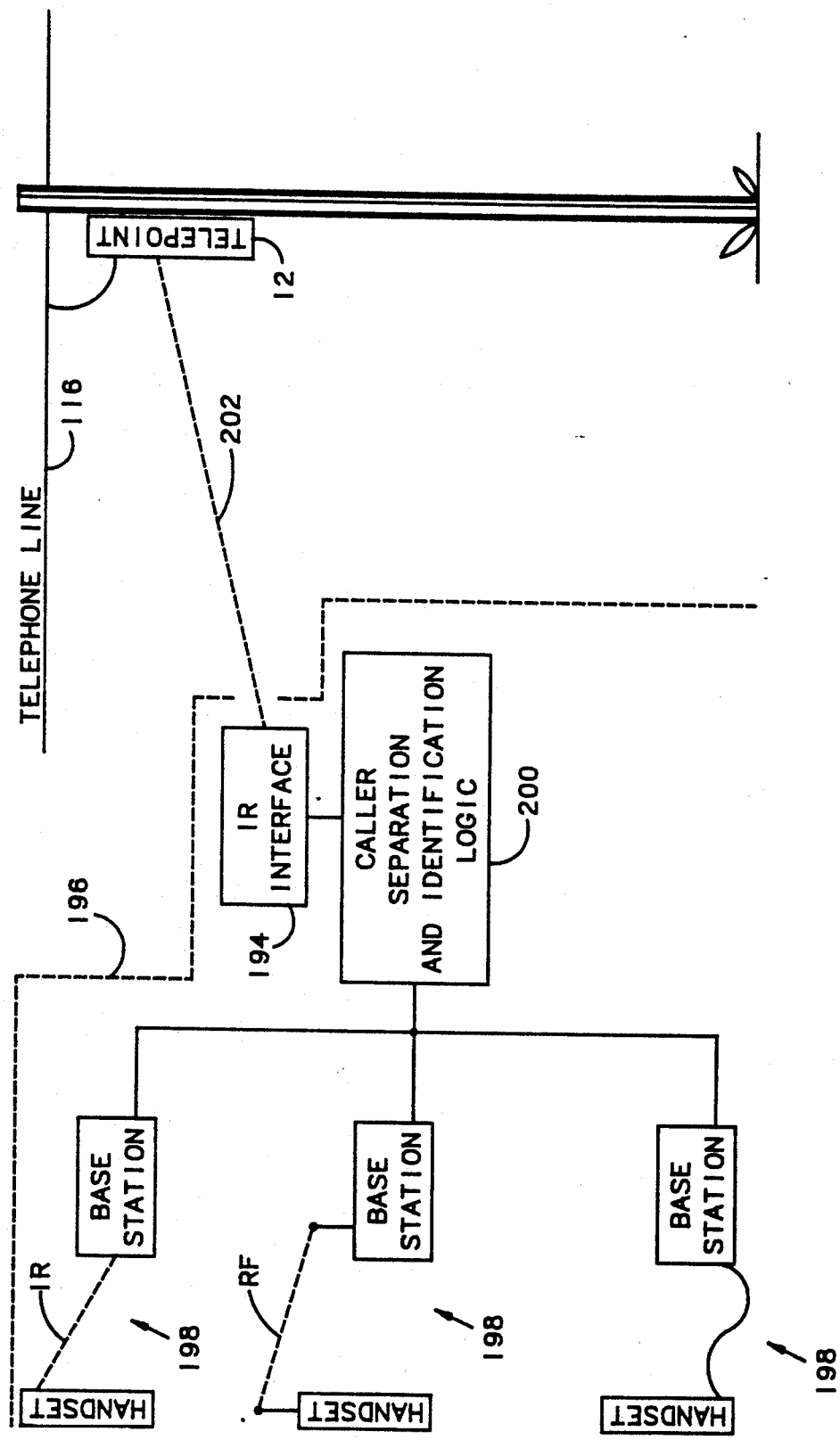
FIG. 23 is a simplified functional block diagram of a telephone system according to the present invention wherein a plurality of user devices of different types are connected to the outside telephone system via an IR telepoint link.

Another non-obvious adaption of our prior art patent's teachings to provide additional benefits therefrom is shown in FIG. 23. In the prior art of telephone systems, if one has a building (as represented by the dashed line 196) containing a plurality of users 198 to be connected to telephone lines 116 outside of the building, a physical connection is typically made using electrical or optical cables. Potential changes can be made in either of two ways—either extra lines are included for later expansion (a waste) or extra lines are brought into the building 196 when needed (costly and time consuming). The approach of FIG. 23 eliminates both shortcomings of the prior art. The users 198 (comprising IR, RF, or hard-wired equipment) are connected to caller separation and identification logic 200 which, in turn, is connected to a bi-directional IR interface 194. The IR interface 194 effects an IR interface 202 with a telepoint 12 at the location of (and connected to) the telephone lines 116. The caller separation and identification logic 200 operates substantially in accordance with the logic described in detail hereinbefore and, therefore, it will not be described in any great detail at this point to avoid redundancy. It is sufficient to say that the caller separation and identification logic 200 accomplishes in one place what the individual handsets normally accomplish in communicating with a telepoint 12 to avoid more than one user from connecting to a telephone line through the telepoint 12 at a time.

Figure 24:
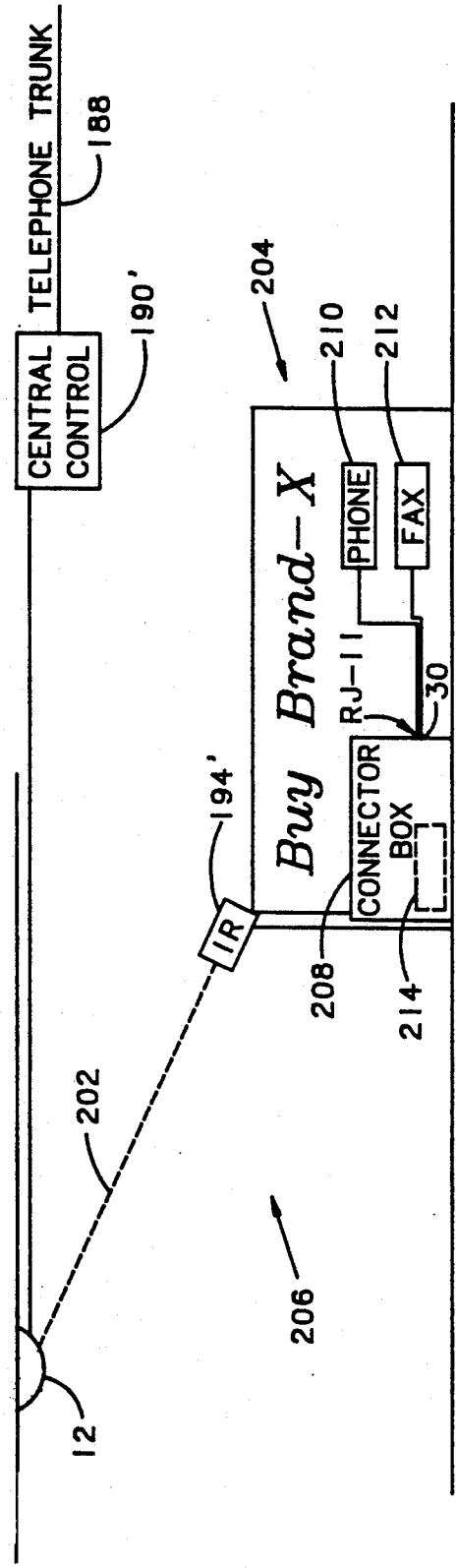
FIG. 24 is a simplified partial functional block diagram depicting an IR phone system according to the present invention for use in convention halls and such.
Figure 25:
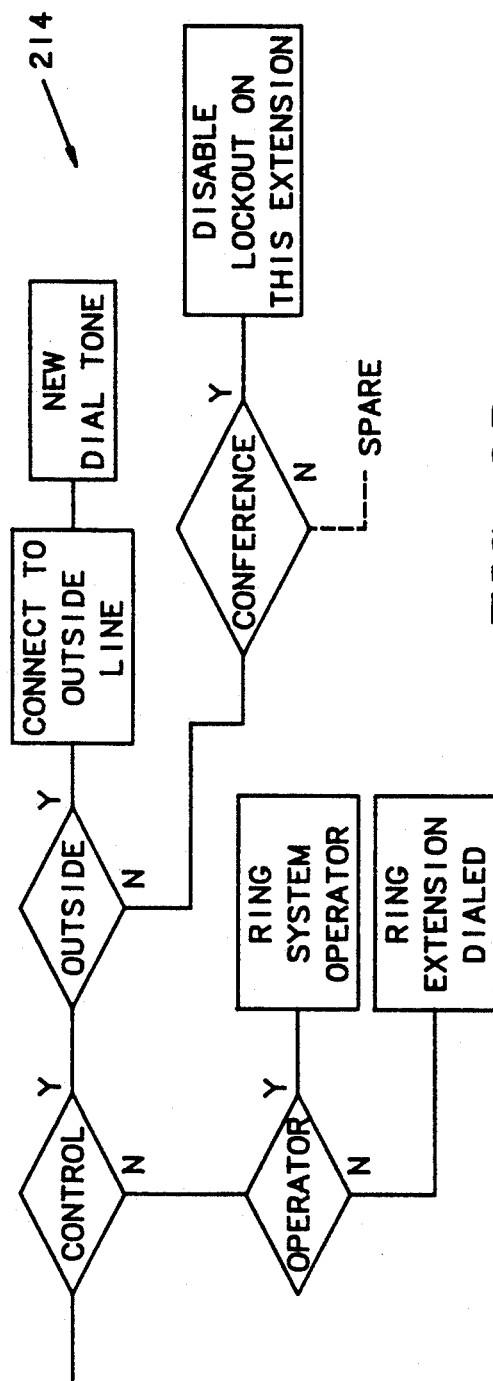
FIG. 25 is a logic flowchart for a portion of the central control functions of the system of FIG. 24.

A modification and variation of the foregoing for use in convention centers, and the like, is shown in FIGS. 24 and 25. Typically at a trade show or the like, the renters of each space provide a display booth 204 and pay large sums of money to have dedicated telephone lines run to the booth for the short duration of the show. The telephone equipment must be placed in inconvenient locations to prevent booth attendees from tripping over the wires. Moreover, there is no central answering and screening service. Not only that, it is virtually impossible for the telephone numbers of the booths to be made available so that one booth can call another. In the large convention centers employed for many current trade shows, this can be a considerable inconvenience. The system 206 of FIGS. 24 and 25 eliminates those shortcomings of the prior art. Once again we see a plurality of repeater type telepoints 12 connected to a central control station 190' which, in turn, is connected to a telephone trunk line 188. At each booth 204 there is a fixed IR interface unit 194' which is pointed at one of the telepoints 12. The interface unit 194' is connected to a connector box 208 having one or more RJ-11 jacks 30 into which telephone equipment such as a phone 210 or facsimile machine 212 can be plugged. More importantly, the connector box 208 contains control and interface logic 214 generally as described hereinbefore and to also perform the functions to be described hereinafter. A portion of the logic 214 to provide functions particular to this implementation is shown in flowchart form in FIG. 25. The flowchart of FIG. 25 refers to inputs on a standard telephone dial pad. Thus, in dialing out by a user, the logic first asks if it is a control input or not. For purposes of discussion only, the numerals 0-9 are considered as "non-control" and a sequence beginning with either the "*" or "#" key is treated as a control sequence (which can be defined in any way convenient to the implementor according to techniques well known to those skilled in the art). Other schemes could, of course, be employed. If non-control and the "0" key, the logic 214 rings the operator function at the central control station 190'; otherwise, the logic 214 causes the central control station 190' to ring another extension (i.e. booth). Two "control" functions are depicted in the flowchart of FIG. 25; however, those skilled in the art will undoubtedly be able to think of others within the scope and spirit of this invention when provided with the capability that it provides over the prior art approach described above. Thus, if the user requests an outside line, the logic 214 connects to one. If a conference call is requested, any lockout logic of the type shown in our issued patent which prevents more than one user device from accessing an outside line through a telepoint is disabled so as to permit more than one user to be on the line at the same time (i.e. a conference call).

In a variation of the foregoing, the extension-calling aspect is replaced by an RF-initiated pager in the handset as disclosed in our prior patent. This system would have particular application for large public buildings, stadiums, and the like. Take, for example, a doctor attending a ball-game. At present, the doctor carries a pager. If called, the doctor must leave his/her seat and go to find a public telephone (or carry a separate cellular system). With this variation of the present invention, the doctor rents an IR handset with a built-in pager from the stadium and is placed on a list by pager number. Incoming calls are placed to the stadium's published attendees' number and the doctor is asked for. The appropriate pager number is output and the doctor's handset rings. The doctor can then answer the call from his/her seat via one of the IR telepoints spaced conveniently around the stadium.

Several other variations and modifications to the subject matter of the prior patent and the disclosure of this application as provided above have been thought of by the inventors herein. They are not considered as sufficiently important to describe in detail and claim hereinafter; however, it is the inventors' desire that it be made of record herein that they have conceived of these variations and modifications and that the following disclosure thereof act as a publication to prevent the independent patenting thereof by others contrary to the prior rights of the inventors herein. In that spirit and for that reason, the following disclosure is included herein.

Since the user interface is IR (i.e. non-conducting), power lines could be used to transmit telephone information between a last location of actual telephone lines and a remote site. This approach could be employed, for example, to provide emergency telephone access at off-ramps and along the right of way of remote highways. An emergency telepoint could be placed in association with a street lamp. The telepoint could get its power from the power lines connected to the lamp (or from a solar re-charged battery). The telepoint could then impress is data onto the power lines for transmission to a remote location where a second telepoint (or other optical/non-electrically conducting) interface connects the signal from the power lines to a telephone line.

The telepoint could include a cellular transmitter so as to eliminate any wiring to the telephone lines. In this case, the handset would be IR linked to the telepoint. This would be particularly useful for emergency phone locations along highways and in remote areas. The telepoint could get its power from a solar re-charged battery. The reverse situation is also a possibility; that is, a cellular handset communicating by RF to the telepoint, which is connected by an IR link to the telephone line.

Much of the logic associated with IR connected access to the telephone lines could be implemented at the telephone company's central office, thus reducing the complexity and cost of the handsets and telepoints.

The IR interfacing portion of a handset could be mounted on a gimbal mount with a weighted bottom so as to maintain a more or less constant orientation regardless of movement by the user.

The handset to telepoint interface could be a hybrid interface conducted with IR in one direction and RF in the other direction.

The exclusionary features to prevent more than one handset to access a telephone line via an IR telepoint of the prior patent could also be accomplished by packetizing data to individually identifiable handsets rather than employing different frequencies for different users.

An RJ-11 jack included in any IR handset would turn the handset into a data port for access to telephone lines via any IR telepoint as well.

Polarization of the IR signal may provide additional rejection of outside interference and improve the signal to noise ratio.

Wherefore, having thus described our invention, what is claimed is:

1. Apparatus for conducting a light beam signal through a wall comprising:
    a) receiving unit means attached to the wall on one side for receiving a light beam containing the light beam signal at an input thereof and for transmitting a radio frequency signal representing the light beam signal into the wall at an output thereof; and,
    b) retransmitting unit means attached to the wall on an opposite side for receiving said radio frequency signal at an input thereof and for transmitting a new light beam containing the light beam signal at an output thereof;
    c) said receiving unit means includes radio frequency transmitting and antenna means for transmitting said radio frequency signal into the wall; and,
    d) said retransmitting unit means includes radio frequency receiver and antenna means for receiving said radio frequency signal; and additionally comprising,
    e) on-demand means carried by said receiving unit means for transmitting a test energy signal into the wall upon request by a user; and,
    f) signal strength indicating means carried by said retransmitting unit means for receiving said test energy signal and for indicating the strength of said test energy signal whereby said receiving unit means and said retransmitting unit means can be optimally positioned opposite one another on opposite sides of the wall.

2. In a light-connected telephone system wherein a connection between a user device and a base station includes a light beam signal portion, apparatus for conducting the light beam signal through a wall comprising:
    a) receiving unit means attached to the wall on one side for receiving a light beam containing the light beam signal at an input thereof and for transmitting a magnetic energy signal representing the light beam signal into the wall at an output thereof; and,
    b) retransmitting unit means attached to the wall on an opposite side for receiving said magnetic energy signal at an input thereof and for transmitting a new light beam containing the light beam signal at an output thereof; wherein,
    c) said receiving unit means includes transmitting antenna means for transmitting said magnetic energy signal into the wall;
    d) said retransmitting unit means includes receiving antenna means for inductively receiving said magnetic energy signal;
    e) said receiving unit means further includes on-demand means for transmitting a test energy signal into the wall upon request by a user; and,
    f) said retransmitting unit means further includes signal strength indicating means for receiving said test energy signal and for indicating the strength of said test energy signal whereby said receiving unit means and said retransmitting unit means can be optimally positioned opposite one another on opposite sides of the wall.

3. Apparatus for conducting a light beam signal through a wall comprising:
    a) receiving unit means attached to the wall on one side for receiving a light beam containing the light beam signal at an input thereof and for transmitting a magnetic energy signal representing the light beam signal into the wall at an output thereof; and,
    b) retransmitting unit means attached to the wall on an opposite side for receiving said magnetic energy signal at an input thereof and for transmitting a new light beam containing the light beam signal at an output thereof; wherein, c) said receiving unit means includes transmitting antenna means for transmitting said magnetic energy signal into the wall;

d) said retransmitting unit means includes receiving antenna means for inductively receiving said magnetic energy signal;

e) said receiving unit means further includes on-demand means for transmitting a test energy signal into the wall upon request by a user; and, f) said retransmitting unit means further includes signal strength indicating means for receiving said test energy signal and for indicating the strength of said test energy signal whereby said receiving unit means and said retransmitting unit means can be optimally positioned opposite one another on opposite sides of the wall.

* * * * *